United States Patent
Navid et al.

(10) Patent No.: US 9,583,955 B2
(45) Date of Patent: Feb. 28, 2017

(54) MODULAR CHARGING SYSTEM FOR GAME CONSOLES

(71) Applicant: NYKO TECHNOLOGIES, INC., Los Angeles, CA (US)

(72) Inventors: Amir Navid, Sherman Oaks, CA (US); Herschel Naghi, Beverly Hills, CA (US)

(73) Assignee: Nyko Technologies, Inc., Los Angeles, CA (US)

( * ) Notice: Subject to any disclaimer, the term of this patent is extended or adjusted under 35 U.S.C. 154(b) by 143 days.

(21) Appl. No.: 14/548,251

(22) Filed: Nov. 19, 2014

(65) Prior Publication Data

US 2016/0141901 A1    May 19, 2016

(51) Int. Cl.
 *H02J 7/00* (2006.01)
 *A63F 13/98* (2014.01)
 *H02J 7/02* (2016.01)

(52) U.S. Cl.
 CPC ............ *H02J 7/0045* (2013.01); *A63F 13/98* (2014.09); *H02J 7/0044* (2013.01); *H02J 7/025* (2013.01)

(58) Field of Classification Search
 CPC ...................................................... H02J 7/0045

USPC .................................................. 320/107, 115
See application file for complete search history.

(56) References Cited

U.S. PATENT DOCUMENTS

| | | | |
|---|---|---|---|
| 6,992,462 B1 * | 1/2006 | Hussaini | A63F 13/06 320/114 |
| 8,143,850 B2 * | 3/2012 | Erickson | H02J 7/0027 320/115 |
| 2007/0207862 A1 * | 9/2007 | Calhoun | A63F 13/08 463/46 |

* cited by examiner

*Primary Examiner* — Richard V Muralidar
(74) *Attorney, Agent, or Firm* — Burch Dallmann LLP

(57) ABSTRACT

A video game controller charging device is supported directly on the top of a video game console and integrated therewith. The device includes a main body portion having a console-engaging structure for providing support to the device while positioned on top of the game console. One or more controller support surfaces, formed as cradles or docking structures for receiving game controllers, are formed on a top surface of the charging device. An extension arm engages a second surface of the game console and includes power connector integrated therein and adapted to engage a power source connection on the game console when the charging device is installed on the game console. Fastening devices may include suction devices that may be selectively activated to secure the charging device to a surface of the game console.

12 Claims, 7 Drawing Sheets

MODULAR CHARGING SYSTEM FOR GAME CONSOLES

BACKGROUND

1. Technical Field

The present disclosure relates to the field of charging systems for video game controllers.

2. Background Information

Various devices have been devised for charging video game controllers. Such devices typically utilize a carriage or cradle for receiving and supporting the game controller as well as a power supply for providing energy to recharge a power storage device, such as a battery, on the video game controller. The prior art is exemplified by U.S. Pat. No. 8,143,848, the subject matter of which is incorporated herein in its entirety.

Existing devices typically involve a separate structure that is supported in a remote location from the gaming console and requires a power cord that is typically plugged into a wall outlet. The separate structure does not lend itself to compact storage and integrated association with the gaming console. Moreover, the separate power cord adds to the complexity in managing the many power devices that are typically located near a video gaming console, such as additional devices for entertainment, including satellite receivers and digital video recorders. It would therefore be advantageous to provide a device and system which addresses the aforementioned problems and others.

SUMMARY

Aspects of the invention provide a video game controller charging device that may be supported directly on the top of a video game console and integrated therewith. The device may include a main body portion having a console-engaging structure for providing support to the device while positioned on top of the game console. One or more controller support surfaces, which may be formed as cradles or docking structures for receiving game controllers, may be formed on a top surface of the charging device. An extension arm may be provided on the charging device for extending from the main body to engage a second surface of the game console. The extension arm may be provided with a power connector integrated therein and adapted to engage a power source connection on the game console when the charging device is installed on the game console.

Aspects of the invention also provide fastening devices as part of the gaming console engaging structure, which may include suction devices that may be selectively activated to secure the charging device to a surface of the game console. The fastening devices may be provided on a fastening subassembly which may be first installed on the game console surface and then receive an interlocking controller support assembly having docking cradles formed therein for supporting one or more game controllers thereon.

BRIEF DESCRIPTION OF THE DRAWINGS

The features and attendant advantages of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto.

DETAILED DESCRIPTION

Figure 1:
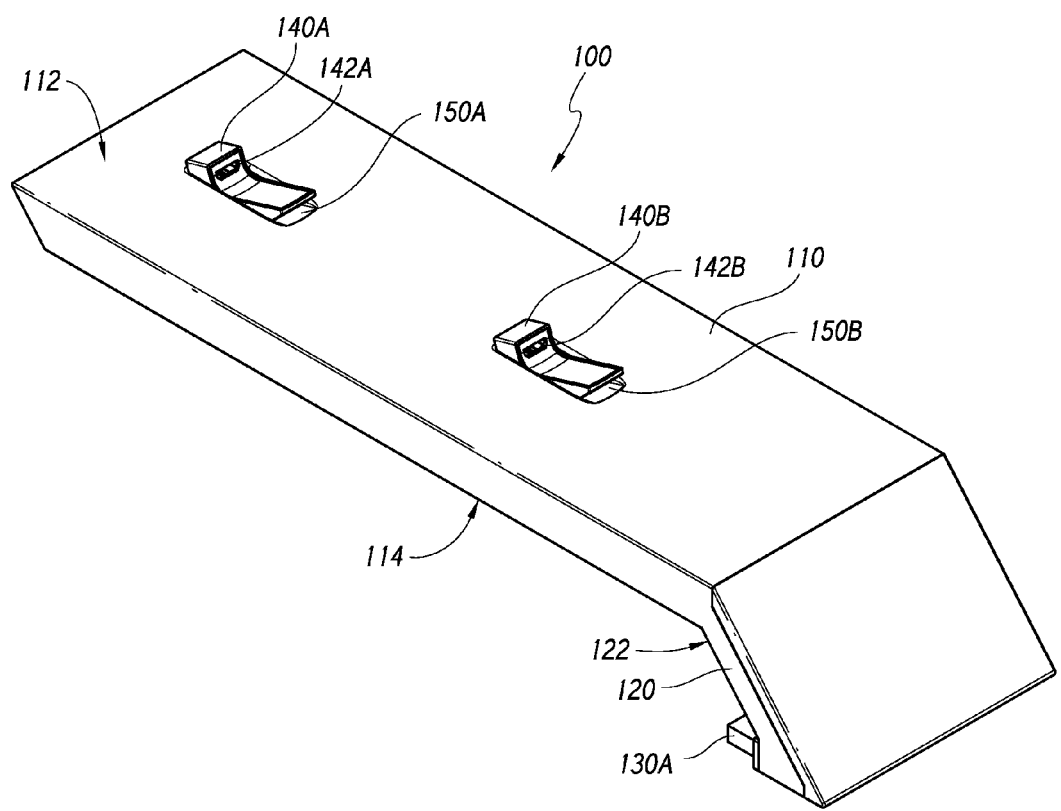
FIG. 1 is a perspective view of a game controller charging device according to one aspect of the invention.

FIG. 1 is a perspective view of a game controller charging device according to an aspect of the invention. The device, generally referenced 100, includes a main body portion 110 which includes a top game controller support surface 112 and a bottom console-engaging support structure 114 for engaging a surface of a game console (not shown in FIG. 1) and supporting the charging device 100 thereon. Bottom console-engaging support structure 114, according to this aspect of the invention, may be a flat bottom surface of the main body portion 110—the underside of the main body portion 110 shown in FIG. 1. A pair of game controller power connectors 140A and 140B are disposed in respective recesses 150A and 150B, formed in the top game controller support surface 112. Game controller power connectors 140A and 140B may include mini-USB connectors 142A and 142B, which are in electrical communication with internal conducting elements to convey power and information from a gaming console in a manner that will be further described herein.

An extension arm 120 extends from the main body portion and may include a second console engaging support structure 122 for engaging a surface of a gaming console and supporting the charging device 100 thereon. A game console power connector 130, which may be a male USB connector, extends from the extension arm 120 such that, when the charging device is installed on the game console, the power connector 130A fits within a correspondingly-shaped connector, i.e., a female USB connector, on the game console, providing power, information and further structural support to the charging device 100.

Figure 2:
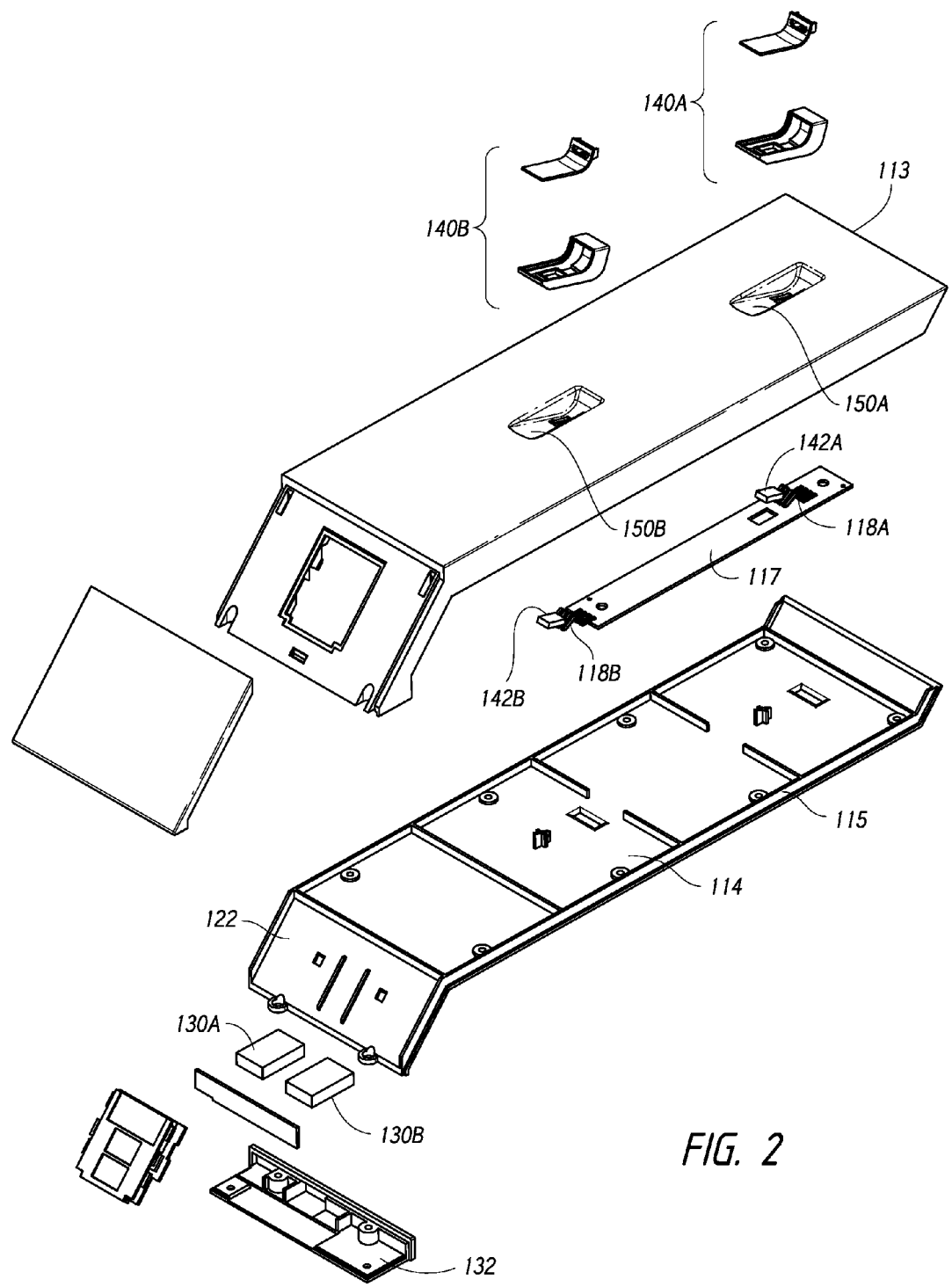
FIG. 2 is an exploded perspective view of the game controller charging device of FIG. 1.

Referring additionally to FIG. 2, which is an exploded view showing the internal components of the exemplary embodiment of FIG. 1, main body 110 may generally comprise two sections, a top section 113 and bottom section 115, which may be injection molded plastic elements secured together in a known manner, such as by adhesive or screw fasteners (not shown). Bottom section 115 includes a console-engaging support structure 114, which may be a generally planar wall formed as part of the bottom section 115, the underside of which engages the game console surface. Bottom section 115 may also include an extension arm bottom portion comprising the extension arm console engaging support structure 122 for engaging a second surface on the game console to support the charging device. Housed within the main body 110 (FIG. 1) may be a printed circuit board 117 having conductor paths (not shown) that communicate electronically with extension cables 118A and 118B, (i.e., forming a dongle connector) which in turn communicate with mini-USB connectors 140A and 140B, in a manner that will be readily understood by those of ordinary skill in the art. Printed circuit board 117 is also in electronic communication, through a suitable cable or conductive path (not shown) with USB connectors 130A and 130B. USB connectors 130A and 130 may be secured within a mounting plate 132, which is fastened to the main body bottom section 115.

Figure 5:
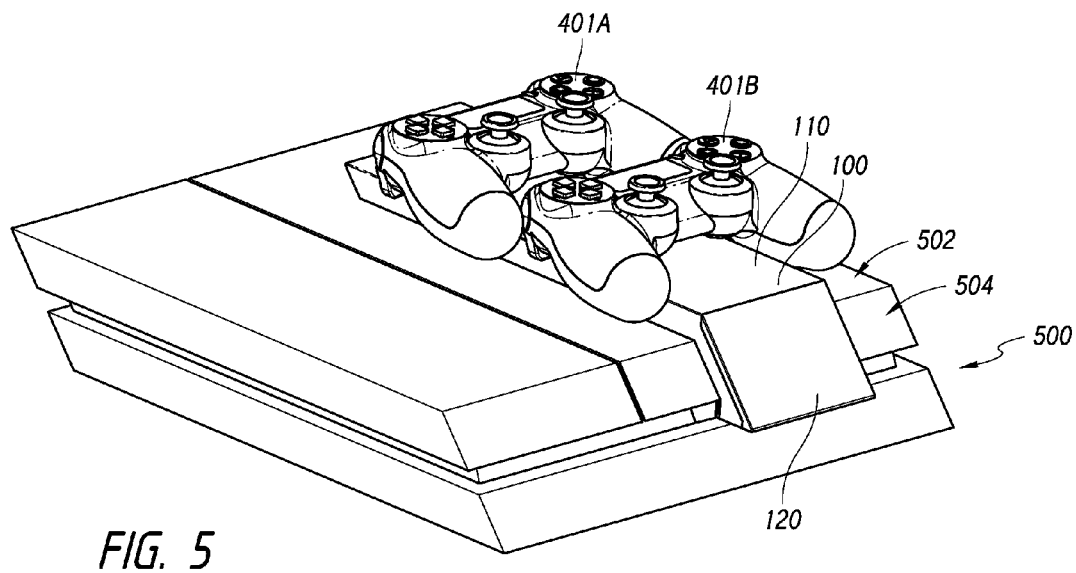
FIG. 5 is a perspective view showing the game controller charging device of FIGS. 1 and 2 installed on a game console and supporting two game controllers.

FIG. 5 is a perspective view showing the charging device of Figured 1 and 2 installed on a game console 500. A top surface 502 of the game console 500 is engaged by the console-engaging support structure—the bottom surface 114 (FIGS. 1 and 2) of main body 110. A second surface 504 of the game console 500 is engaged by the second console-engaging support structure—the bottom surface 122 (FIGS. 1 and 2) of extension arm 120. A pair of game controllers, 401A and 401B are shown supported on the top surface of the charging device 100 in a charging position. As will be recognized, the charging device 100 forms a compact, integrated pairing with the game console 500, without the obtrusive cables and wires of prior art devices. Moreover, the charging device 100 enables the game controllers to be conveniently and compactly mounted for charging in a position that is immediately proximate to the game console itself.

Figure 3:
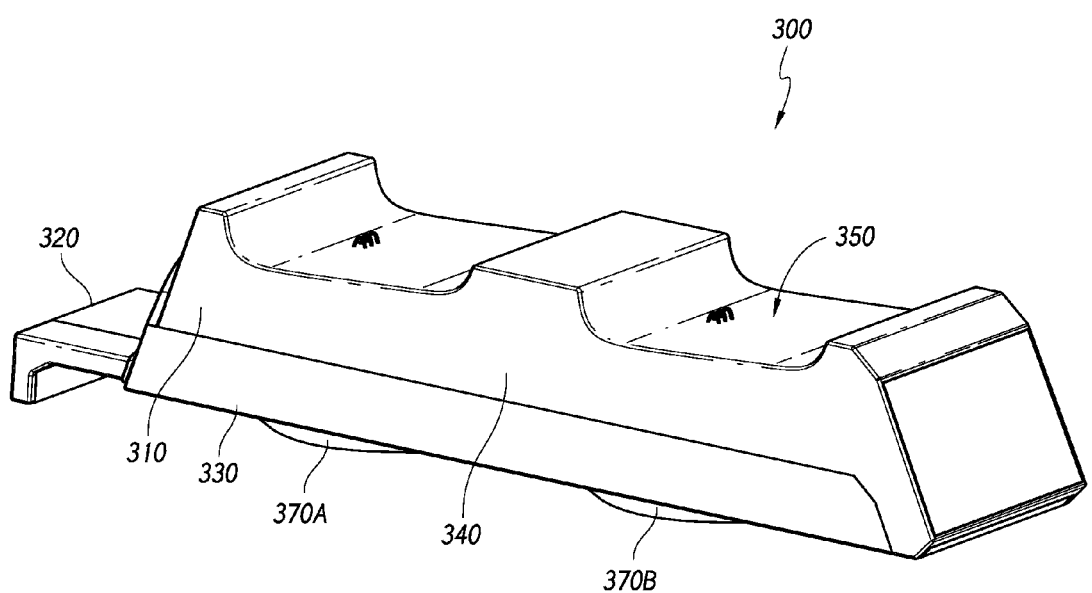
FIG. 3 is perspective view of a game controller charging device according to another aspect of the invention.

FIG. 3 is a perspective view of a charging device 300 according to another aspect of the invention. This exemplary embodiment provides fastening devices for engaging the game console—console-engaging support structure—in the form of suction devices 370A and 370B on an underside of the charging device 300. A main body 310 may comprise two cooperating assemblies: a lower fastening base assembly 330 and an upper cradle assembly 340. An extension arm 320 extends from the main body 310.

Figure 4:
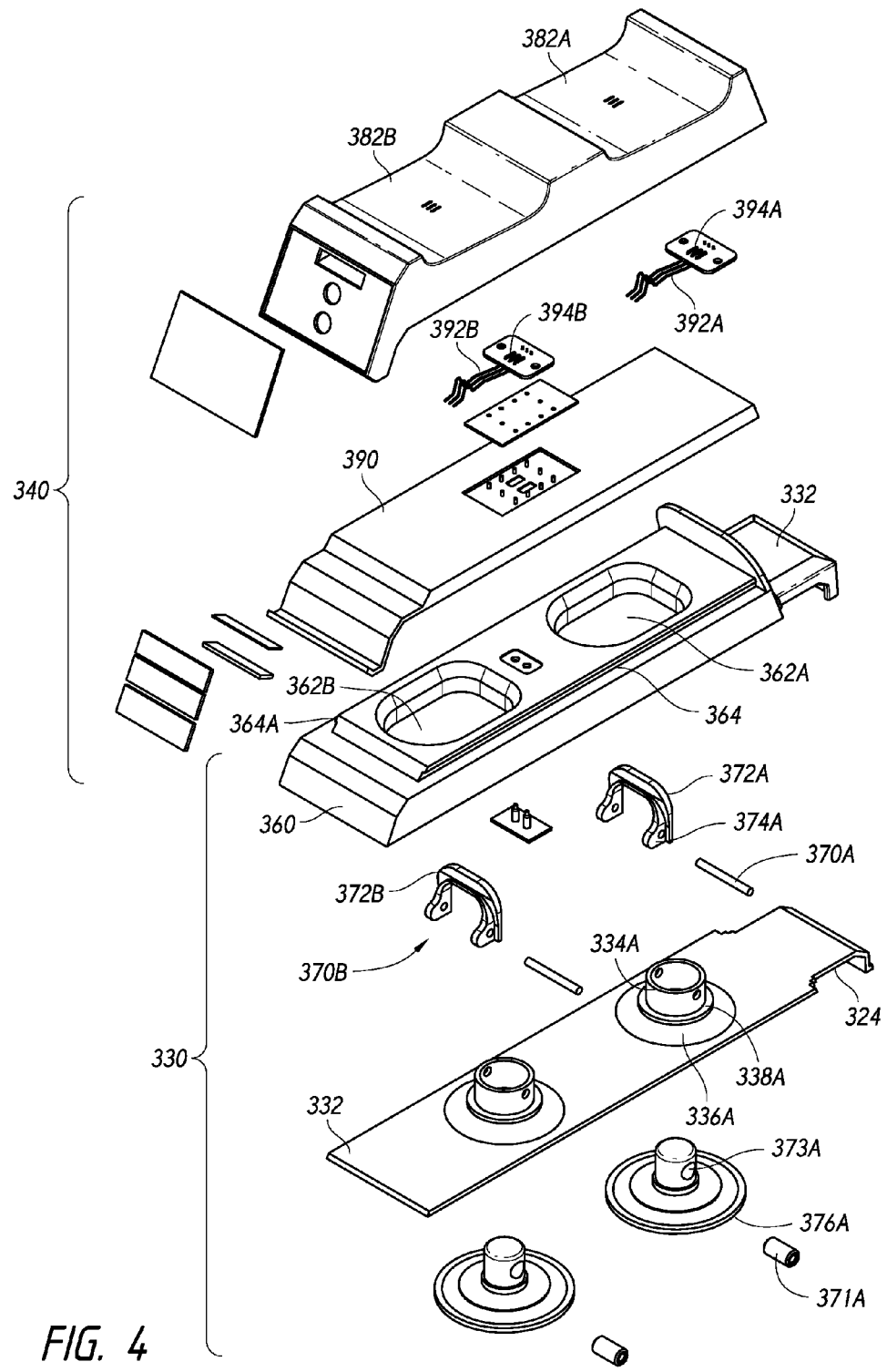
FIG. 4 is an exploded perspective view of the game controller charging device of FIG. 3.

Referring additionally to FIG. 4, which is an exploded perspective view showing the internal components of the exemplary embodiment of FIG. 3, the two cooperating assemblies are referenced by brackets 330 and 340. Base assembly 330 may include a lower suction device mounting plate 332 for securing suction devices 370A and 370B thereon. To avoid unnecessary duplicity herein, only the details of suction device 370A (FIG. 3) will be described, with those of ordinary skill in the art understanding that suction device 370B will have like structure. The structure of suction device 370A may include actuating arm 372A having cam surface 374A for effecting a vacuum within suction cups 376A. Suction device 370A may further include a hole 373A formed in a stem portion of suction cup 376A and adapted to receive a bushing 371A and retainer pin 370A, which also extends through holes in the actuating arm 372A. Suction device mounting plate 332 may include a retaining collar 334A as well as a conical recess 336A formed therein. When the suction devices are assembled, the suction cup stem extends into the collar 334A and retainer pin 373A is inserted first into the right side of actuator 372A, then through hole in collar 338A, then bushing 371A which resides inside stem hole 373A. Pin 370 further extends through the opposite side of collar 338A and then through the hole in the left side of actuator 372A, thereby retaining the suction cup 376A within the mounting plate 332 and providing for pivoting movement of actuator 372A. In operation, cam surface 374A cooperates with an annular shoulder 338A such that when actuating arm 372A is pivoted (counterclockwise in FIG. 4), suction cup 376A is pulled upward into conical recess 336A, thereby creating a vacuum within suction cup 376A, which engages a surface on the game console. Base assembly 330 also includes a top cover 360, including respective recesses 362A and 362B formed therein for permitting a user to access the actuating arms 372A and 372B of suction devices. Top cover 360 and fastening device mounting plate 332 also include extension arm top portion 322 and extension arm bottom portion 324, respectively, which form extension arm 320 (FIG. 3) when assembled.

Figure 6:
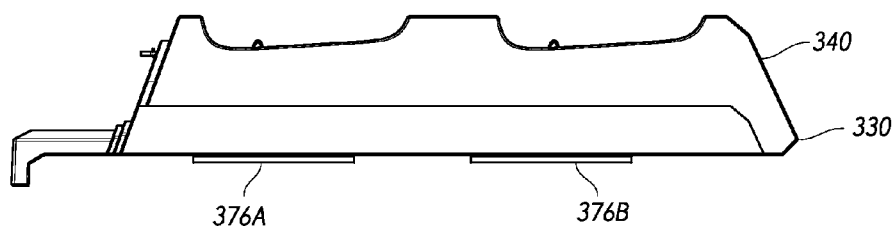
FIG. 6 is a side view of the game controller charging device of FIGS. 3 and 4, showing suction devices mounted on an underside thereof.

FIG. 6 illustrates a side view of the base assembly 330 and cradle assembly 340 assembled together and showing the position of fastening devices (suction cups 376A and 376B) for engaging a surface of a game console.

Referring again to FIG. 4, according to a further aspect of the invention, base assembly top cover 360 includes an interlocking structure in the form of a pair of retaining ridges 364 formed thereon for cooperating with complimentarily-shaped structure on the upper cradle assembly 340 such that the cradle assembly 340 may be installed on and removed from the base 330 with a sliding motion, as will be described further below. Upper cradle assembly 340 further includes a top cradle member 380 with cradle or docking recesses 382A and 382B formed therein for supporting respective game controllers. Upper cradle assembly 340 also includes a cradle assembly bottom plate 390, the underside of which is provided with the cooperating structure for retaining ridges 364. Conductive elements 392A and 392B are secured to the bottom plate 390 and include conductors 394A and 394B which protrude through corresponding recesses formed in the top cradle member 380 to engage and provide power and information connections to the game controllers supported in the docking recesses 382A and 382B.

Figure 7:
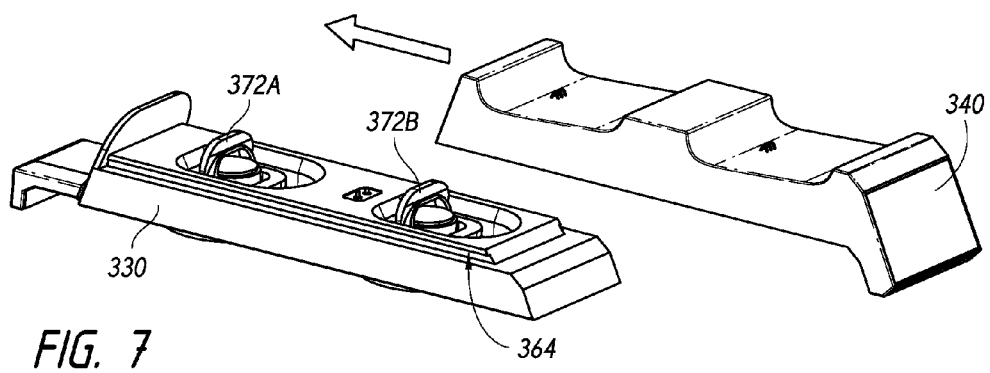
FIG. 7 is a perspective view showing an installation operation associated with the game controller charging device of FIGS. 3 and 4.

FIG. 7 illustrates an assembly operation for a charging device described above relative to FIGS. 3 and 4. Base assembly 330 is illustrated with suction device actuating arms 372A and 372B in a generally vertical position in which suction devices are in a disengaged position and the base assembly 330 is disengaged from a game console. Upper cradle assembly 340 is illustrated in a removed position from engagement of the interlocking ridge 364 of the base assembly 330.

Figure 8:
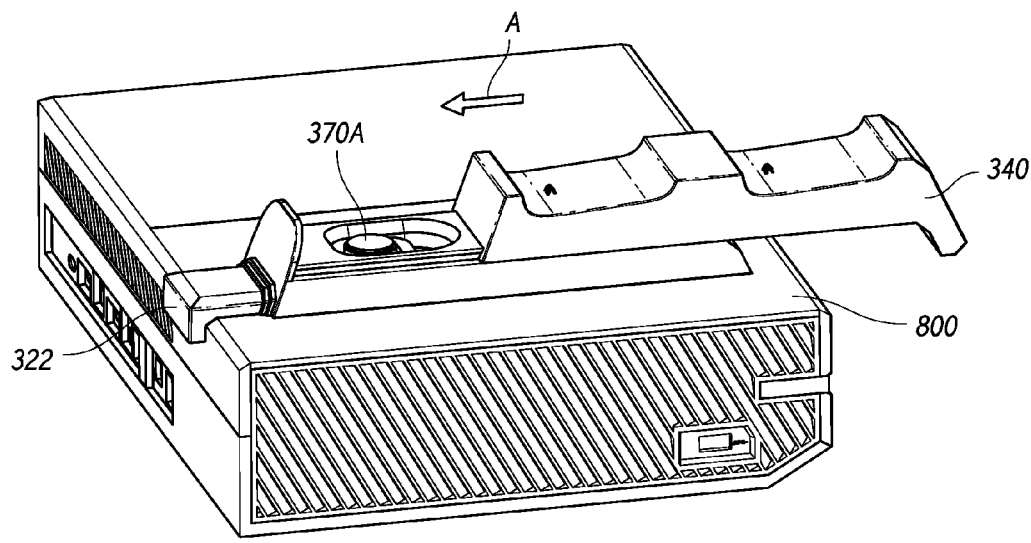
FIG. 8 is a perspective view showing an installation operation of the game controller charging device of FIGS. 3 and 4 on a game console.
Figure 9:
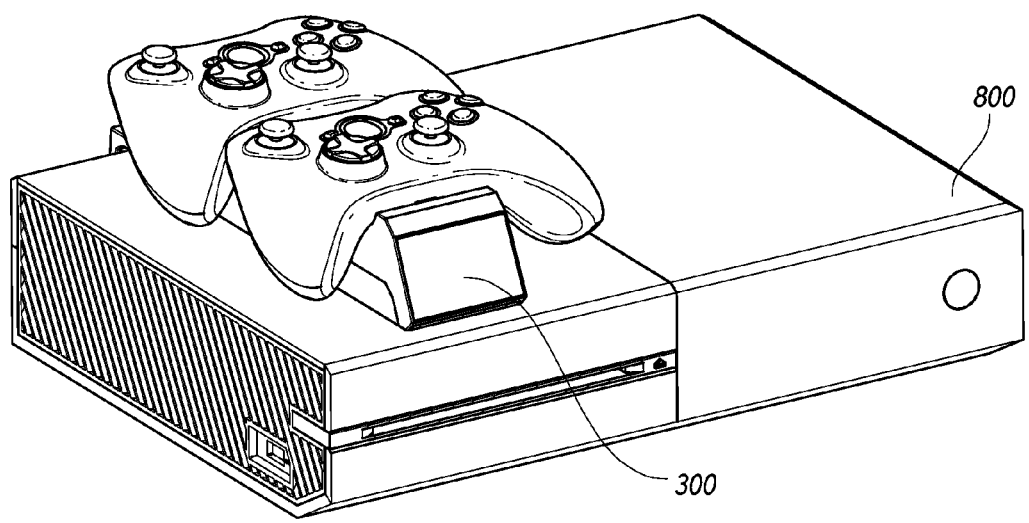
FIG. 9 is a perspective view showing the game controller charging device of FIGS. 3 and 4 in an installed position on a game console and supporting two game controllers.

FIG. 8 illustrates an installation operation for the exemplary embodiment described above with regard to FIGS. 3 and 4. In this illustration, the base assembly 330 has been secured to a top surface of game console 800 by actuation of the fastening devices 370A and 370B (only device 370A is shown in FIG. 8). Upper cradle assembly 340 is shown in an intermediate position towards installation, having been slid in direction of arrow A, towards a fully installed position, with the interlocking ridge 364 (FIG. 4) of the base 330 retaining the upper cradle assembly thereon. FIG. 9 illustrates the charging device exemplary embodiment of FIGS. 3 and 4 in a fully installed position and supporting two game controllers in a charging position.

Figure 10:
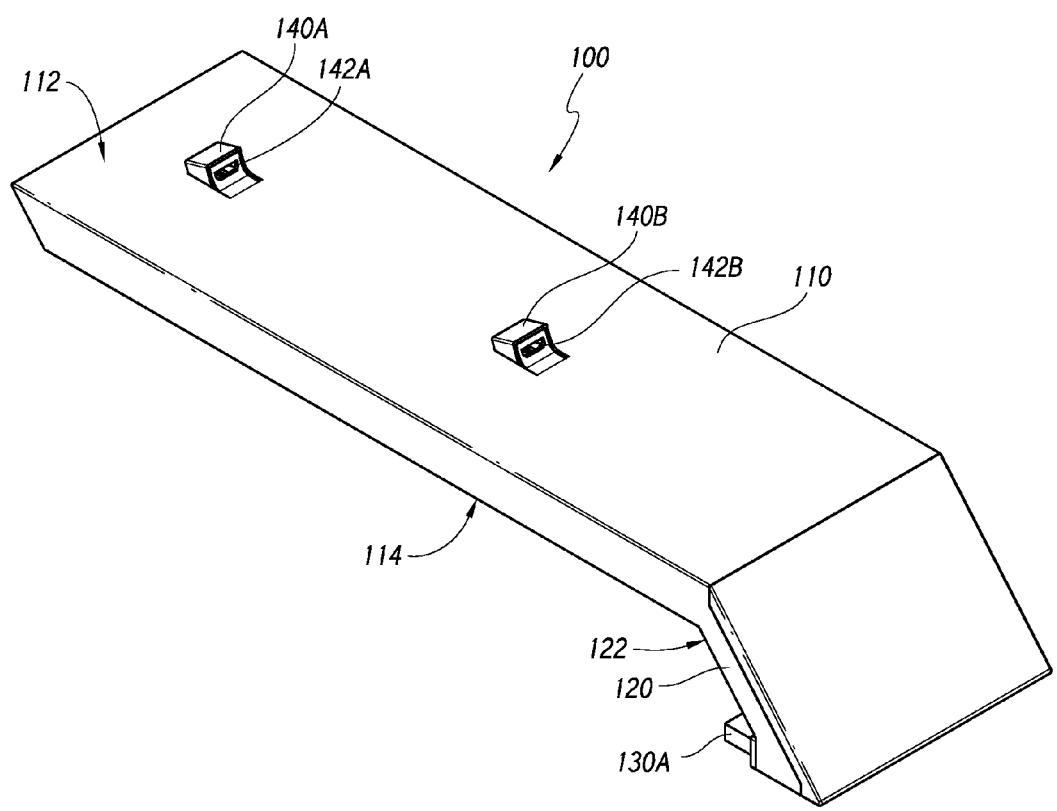
FIG. 10 is a perspective view of an alternate exemplary embodiment to that illustrated in FIGS. 1 and 2, in which the game controller connectors are integrated with the main body rather than provided in the form of dongles.

FIG. 10 illustrates an alternative exemplary embodiment to that illustrated and described with regard to FIGS. 1 and 2, in which the mini-USB connectors 140A and 140B are integral with the main body 112 instead of being provided with extension cables (i.e., dongles) 118A and 118B (FIG. 2).

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents that fall within the spirit and scope of the basic underlying principles disclosed and claimed herein.

As an example, although the invention is described with regard to charging game controllers, the invention also contemplates charging devices for directly charging batteries to be used in controllers or otherwise, rather than charging only controllers. Moreover, those of ordinary skill in the art will recognize that the orientation of the controllers and/or battery packs to be charged by charging devices according to the invention may be different than the specifically disclosed exemplary embodiments. That is, charging devices according to the invention may support controllers or battery packs in vertical or horizontal orientation and in positions that are elevated or resting upon the charging device structure.

Further, the invention is not limited to devices in which the structure for conveying power from the game console or separate power supply to the game controllers or batteries being charged involves plugs, wires or contact couplings, but also contemplates inductive or wireless couplings to communicate energy to the controllers or batteries to be charged.

What is claimed is:

1. A video game controller charging device for supportingly engaging a video game console and for charging and supporting at least one video game controller, comprising:
   a main body having a game console engaging support structure for engaging a surface on the game console and at least one game controller supporting surface for supporting the at least one game controller;
   a charging system for conveying charging energy to the at least one game controller when the at least one game controller is supported on the at least one game controller supporting surface and;
   an extension arm extending from the main body and having a second game console engaging support structure, the charging system including at least one connector mounted on the extension arm for engaging a power supply connection on the gaming console.

2. The device of claim 1, wherein the charging system comprises a power source that is separate from the game console.

3. The device of claim 1, wherein the game console engaging support structure includes a generally planar surface provided on the charging device for engaging a top surface of a game console.

4. The device of claim 1, wherein the game console engaging support surface includes a fastening device for fastening the charging device to the game console.

5. The device of claim 4, wherein the fastening device comprises a suction device.

6. The device of claim 1, wherein the main body further comprises a base assembly for supporting the device on the game console and a cradle assembly for supporting at least one game controller, the cradle assembly cooperating with the base assembly to permit the cradle assembly to be removed while the base assembly remains supported on the game console.

7. The device of claim 6, wherein the base assembly includes a retaining ridge and wherein the cradle assembly includes structure that cooperates with the retaining ridge to permit the cradle assembly to be slidingly retained on the base assembly.

8. The device of claim 1, wherein the charging system comprises a dongle connector for conveying energy to the device to be charged.

9. The device of claim 1, wherein the charging system comprises a connector for the at least one game controller that is integrated with the main body.

10. The device of claim 1, wherein the game controller supporting surface is adapted to support a battery for use in a game controller and wherein the charging system is adapted to charge the battery.

11. The device of claim 1, wherein the charging system conveys energy to the game controller by wire conductors.

12. The device of claim 1, wherein the charging system conveys energy to the game controller by induction.

* * * * *